United States Patent [19]

Chandler

[11] Patent Number: 4,471,570
[45] Date of Patent: Sep. 18, 1984

[54] RECIRCULATING WIPER FOR AGRICULTURAL CHEMICALS

[75] Inventor: James M. Chandler, College Station, Tex.

[73] Assignee: The United States of America as represented by the Secretary of Agriculture, Washington, D.C.

[21] Appl. No.: 347,129

[22] Filed: Feb. 9, 1982

[51] Int. Cl.³ .............................................. A01G 15/00
[52] U.S. Cl. ....................................................... 47/1.5
[58] Field of Search ..................................... 47/1.5, 1.7

[56] References Cited

U.S. PATENT DOCUMENTS 2,605,587  8/1952  Wester et al. ........................... 47/1.5
3,651,600  3/1972  Ewing ..................................... 47/1.5
4,359,188 11/1982  Moore ..................................... 47/1.7

Primary Examiner—Robert A. Hafer
Assistant Examiner—Bradley M. Lewis
Attorney, Agent, or Firm—M. Howard Silverstein; David G. McConnell; Raymond C. Von Bodungen

[57] ABSTRACT

A new apparatus which dispenses liquid agricultural chemicals upon physical contact with foliage and recovers excess chemical for reuse is disclosed. A hollow horizontal cylindrical chamber with an opened section forms a mounting means. An expanded metal section with an external fabric covering is affixed over the opening. Means is provided for spraying agricultural chemical onto the fabric, recovering and recirculating the excess chemical for reuse, and moving the saturated fabric into contact with foliage or plants.

5 Claims, 6 Drawing Figures

RECIRCULATING WIPER FOR AGRICULTURAL CHEMICALS

BACKGROUND OF THE INVENTION

1. Field of the Invention

This invention relates to an apparatus which selectively applies agricultural liquid chemicals to plants.

2. Description of the Prior Art

In the prior art the literature teaches that herbicides are applied as sprays, in water or oil, or as dry granules. Basically, herbicides are applied by spraying over the top of plants or directed under the plant canopy toward the base of crop plants. When herbicides are sprayed on the soil before planting or emergence of crop plants, they may be either left on the soil surface or physically incorporated into the soil. Their characteristic phytotoxic properties may be altered by surfactant such as sticking and wetting agents added to their formulations or spray solutions, or by the kind of formulation used, such as granular formulation in place of an emulsifiable concentrate. Other techniques are known but seldom used in the art of applying herbicides. These include the injection of liquid or gaseous formulations directly into the soil with or without the use of an impervious shield, such as a plastic sheet to retain the vapors in the soil, and the use of bars of wax containing the herbicide to rub over the tops of plants. Phenoxy herbicides have been applied to weeds growing above crops by wrapping a tractor-mounted spray-boom with burlap or some other absorbent material. The limiting factor with this concept was to keep the absorbent material sufficiently wet, but avoid dripping the herbicide onto the crop. Herbicides have been sprayed to weeds above the crop canopy with a recirculating sprayer. This system sprays a herbicide solution across the crop row and any herbicide not retained by the weeds is collected by a large spray trap. With this system some herbicide spray may ricochet from the weeds onto crop plants, and some drift of fine spray particles may cause crop injury. With prolonged use of the recirculating sprayer, dirt and plant debris accumulate in the spray traps and ultimately, in the herbicide solution. The debris is troublesome because it impedes the flow of herbicide solution through the strainers and nozzles and will ultimately inactivate the herbicide. The rope wick applicator was developed to apply herbicides to weeds taller than the crop. This system requires no pumps or moving parts to deliver the herbicide. It is simply drawn from the reservoir by capillary action and then rubbed on weeds contacting the rope as the applicator moves across the field. With the rope wick applicator the volume of liquid delivered through the rope without drippage is limited to a very narrow range. Under enviornmental conditions of low humidity, high temperatures, or brisk wind, the ropes dry very rapidly. To obtain acceptable control relatively slow speeds of application must be maintained and because the ropes wet only one side of the weed, repeated trips through the field are often necessary.

SUMMARY

The instant invention dispenses liquid agricultural chemical solution upon physical contact with foliage and plants and recirculates any excess agricultural chemical solution and comprises the following in combination: A hollow horizontal cylindrical mounting chamber is sectionally opened on one side. An expanded metal section acts like a grid to allow agricultural chemical to pass through the openings thereof. The expanded metal section is affixed to the mounting chamber over the opened section. A fabric is used to cover the external surface of the expanded metal section and means is provided for spraying agricultural chemical solution from a storage reservoir onto the fabric, thus keeping the fabric saturated with agricultural chemical during use. A recovery means catches any excess agricultural chemical solution which drips or flows from the fabric and returns the excess to the storage reservoir for reuse. Means is also provided to bring the saturated fabric into contact with an agricultural plant or foliage.

DESCRIPTION OF THE PREFERRED EMBODIMENTS

In the preferred embodiments of the invention illustrated, specific terminology will be resorted to for the sake of clarity. However, it is not intended to be limited to the specific terms so selected, and it is understood that each term includes all technical equivalents which operate in a similar manner to accomplish a similar purpose.

Figure 1:
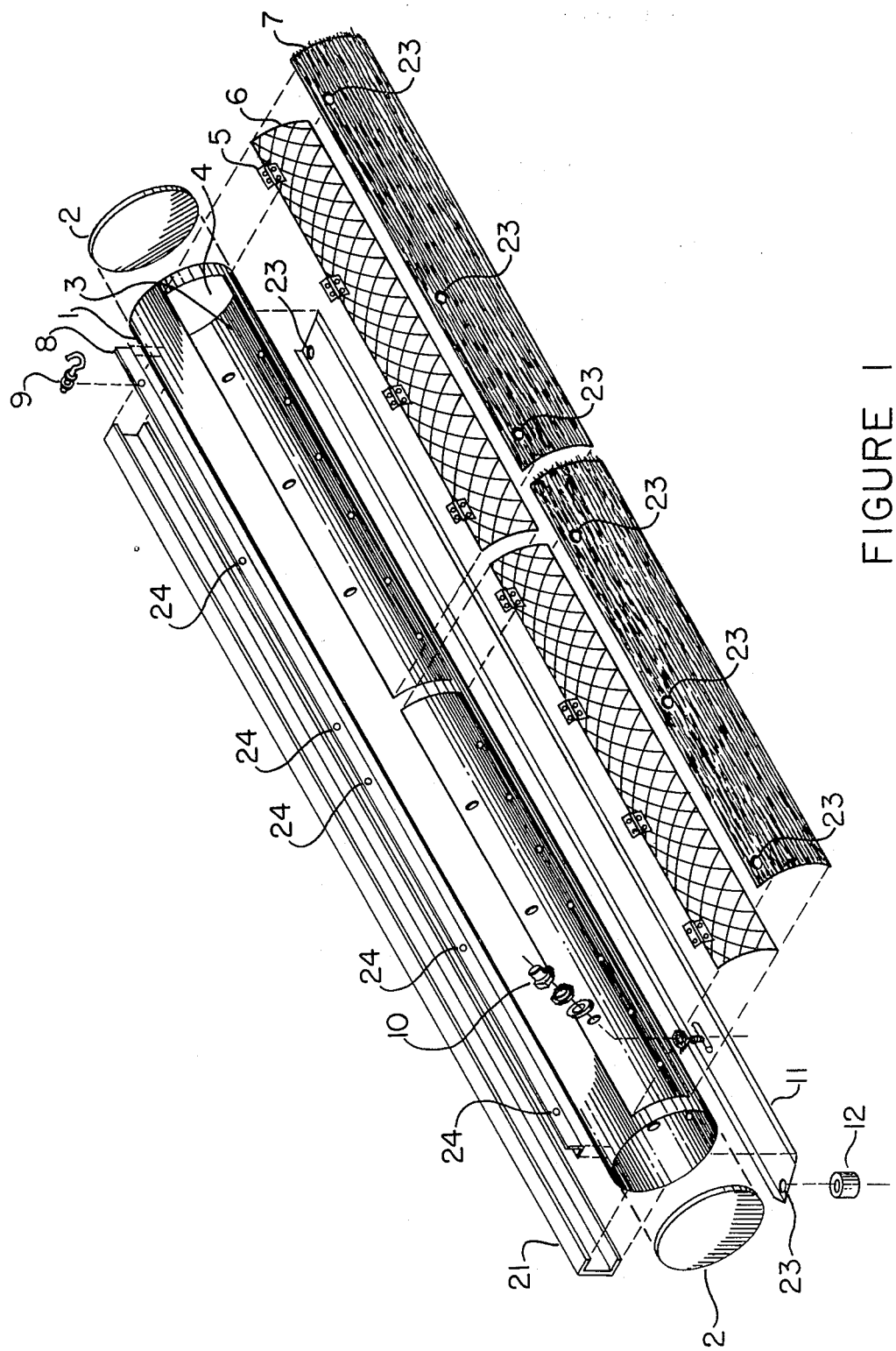
FIG. 1 is a front exploded view of the salient working parts of the recirculating wiper.
Figure 4:
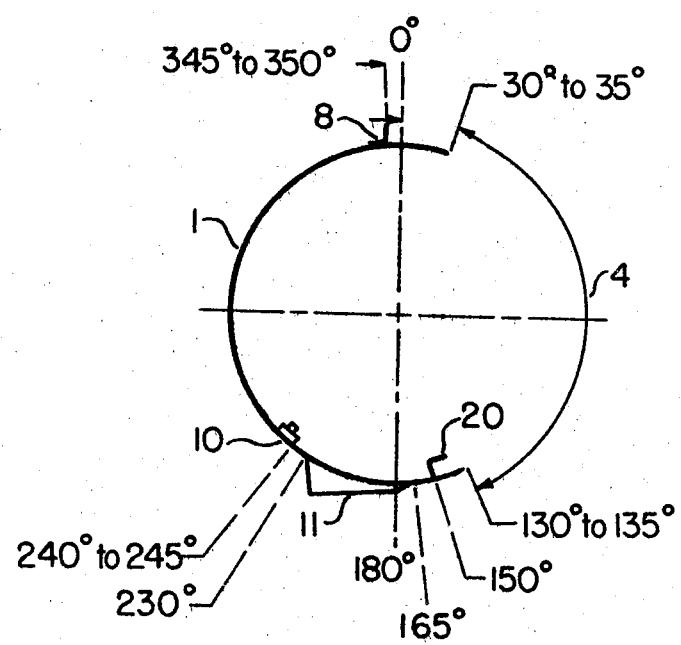
FIG. 4 is a cross-sectional view of the applicator body portion of the recirculating wiper and shows the relative positions of the component parts.

Turning now to the specific embodiments of the invention illustrated in the drawings where FIG. 1 shows an applicator body 1 which acts as the central mounting structure to which the various component parts are attached. Applicator body 1 can be constructed from any material that is compatible with agricultural solutions. In the preferred embodiment, applicator body 1 is constructed from a length (approximately 80 inches) of 8-inch aluminum tubing with an approximate thickness of 0.06 inches or greater. Ends 2 of applicator body 1 are enclosed with flat sheet of aluminum cut to fit and welded in place. Drain holes 3 of at least ¼" are placed at intervals of 5 to 6" at 180° across the bottom of applicator body 1 (see FIG. 4), since body 1 forms a horizontal cylindrical structure. Location of component parts attached to applicator body 1 are referenced to the vertical point with 0° at the top vertical FIG. 4. In structure, longitudinal sections 4 of applicator body 1 are removed from the 30° to 35° through 130° to 135° and replaced with sections 6 of expanded metal which may be attached by hinges 5. Section 6 supports a pad of carpet 7. A length of aluminum angle 8 is used to attach carpet 7 of sections 6 prior to applicator body 1 at the 340° to 345° position by means of bolts or hooks 9. Angle iron 8 is fitted with holes 24 which match holes 23 in carpet pad 7. Carpet pad 7 is provided with a metal grommet to prevent hooks 9 from tearing a hole through the carpet.

Figure 2:
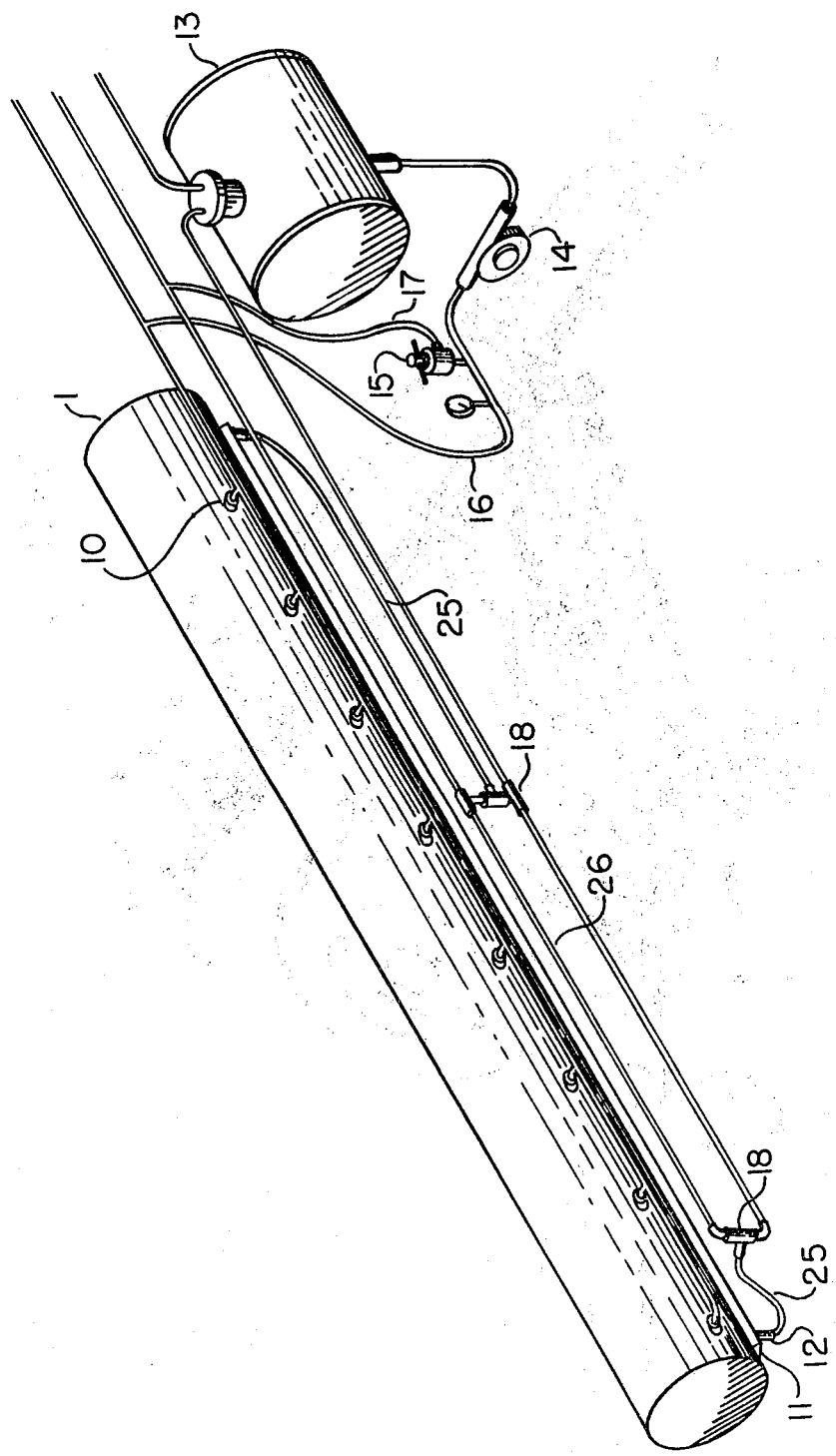
FIG. 2 is an isometric rear view showing the external working parts of the recirculating elements.

Carpet 7 is held in place at the bottom by placing expanded metal 6 section inside applicator body 1 with carpet 7 compressed in between the edge of body 1 and metal section 6. Stops 20 (FIG. 4) are provided inside body 1 to allow the lower edge of section 6 to rest secured and tight. Stops 20 are located at approximately 150° to provide optimum securing. A plurality of standard agricultural spray nozzles 10 are positioned in applicator body 1 at approximately 240°. Any agricultural nozzle is satisfactory, but a TX3 Spray Nozzle with a hollow cone (Spraying Systems Co., North Ave. at Schmale Rd., Wheaton, Ill., 60187) was used. The body of nozzle 10 extends through the wall of applicator body 1 (see FIG. 5). Nozzle bodies 10 are spaced horizontally on 10-inch centers along the back edge of body 1 with spacing dependent upon the type of spray nozzles used. Recovery reservoir 11 is constructed from a length of sheet aluminum with dimensions of 2.5 inches by 5 inches and bent to a 62° angle (see FIG. 6). In the bottom and at both ends of recovery reservoir 11, drain holes 23 (see FIG. 1) are drilled and a 0.5 inch aluminum pipe coupling 12 is attached over drain hole 3 to hook up the agricultural chemical return system. A rear view of applicator body 1 with external chemical return system is shown in FIG. 2. A standard tank 13 suitable for agricultural chemical solutions serves as a source for agricultural solutions to be applied to plants. Agricultural pump 14 moves agricultural solution from tank 13 to solution regulator 15. Regulator 15 allows a determined volumn of solution under predetermined pressure to flow thru hose 16 to nozzle bodies 10 which are mounted in back of applicator body 1. Nozzles 10, inside applicator body 1, spray apply agricultural solution to the back of carpet 7 which is mounted on the front of applicator body 1 and any excess solution flows downward by gravity to applicator reservoir 11. In this manner carpet 7 is super saturated with agricultural chemical and is constantly dripping excess agricultural chemical into recovery reservoir 11. Saturated carpet 7 is brought into contact with the weeds to be killed by means of moving the mechanism across the agricultural field to be treated. When carpet 7 is set into position it is adjusted above the plant canopy and moved across the tops of the crops to contact only the weeds to be killed. (see FIG. 3) which shows the moving and transfer means as well as the means of adjusting the height of carpet 7.

Means for recovering excess chemical in reservoir 11 is provided as follows: Agricultural spray solution is supplied to regulator 15 (FIG. 2) from supply reservoir 13 by means of pump 14 is in excess of what is needed to saturate carpet 7. Therefore, excess chemical solution drips or flows downward by gravity and falls into recovery reservoir 11. This excess chemical solution is bypassed regulator 15 into hose system 17 which is attached to siphon valves 18. Siphon valves 18 are also connected to drain holes 12 in recovery reservoir 11 by means of hose 25. Consequently as the spray solution passes through siphon valve 18 a negative pressure is formed in hose 25 thus pulling excess agricultural chemical from reservoir 11 into return hose 26 which is attached to the top of siphon valve 18 and returns the excess agricultural chemical into supply tank 13.

Figure 3:
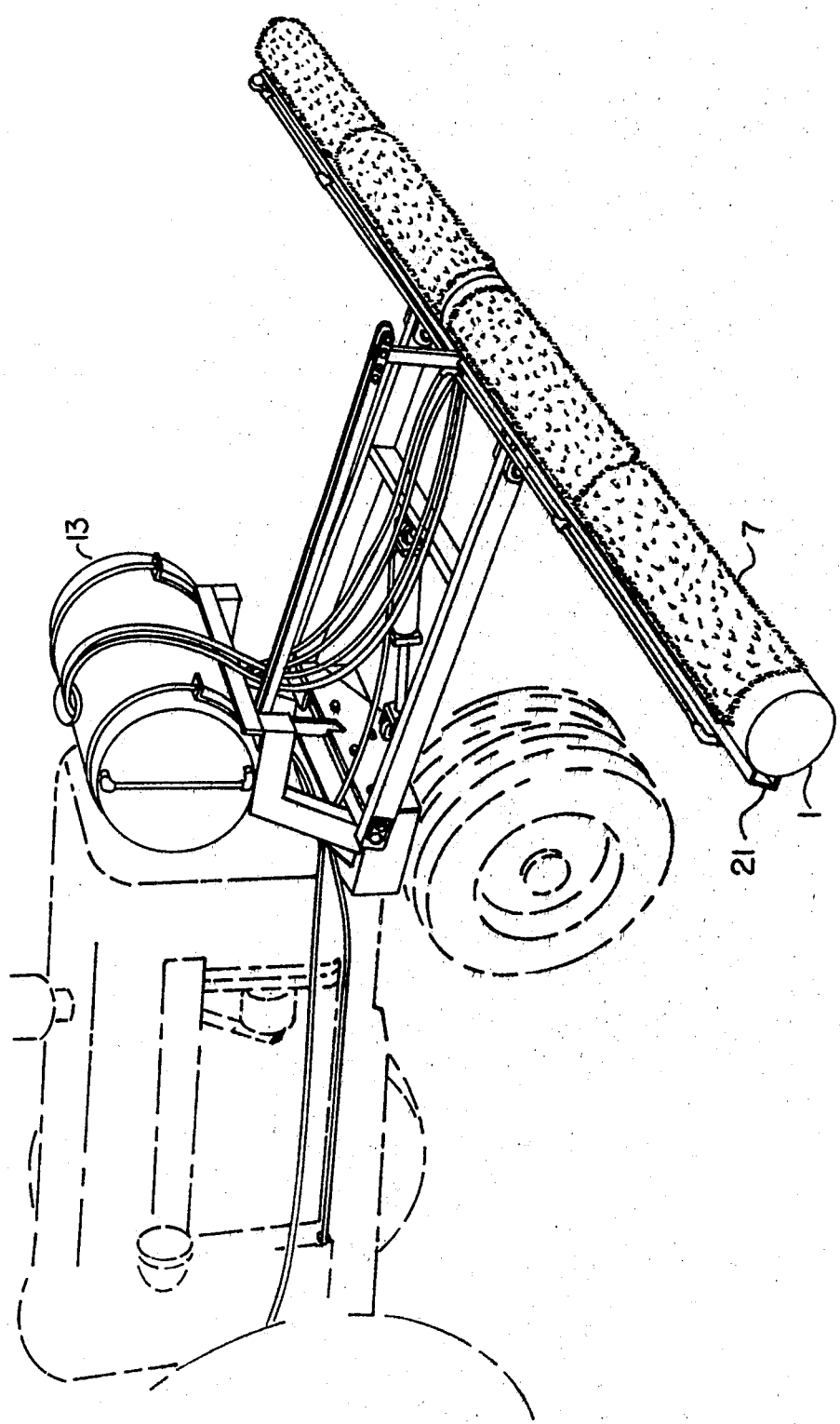
FIG. 3 is an isometric front view showing the wiping surface in relation to the means of attachment to the transporting means.

Applicator body 1, FIG. 1, is attached to a length of 3-inch chanel iron 21 that is attached to any power source such as a tractor (see FIG. 3). The power source should provide a means whereby the applicator body 1 and carpet 7 can be readily positioned at various levels above the crop canopy as the power source moves through the agricultural field.

Carpet 7 should be made from a fabric material that will allow a solution of agricultural chemical to pass through the carpet backing into and on the carpet pile. The carpet pile should be composed of a density, length and material that will retain a volumn of solution without dripping, but allow easy removal when contact is made with plant material. In the instant invention carpet 7 was manufactured by World Carpet, Dalton, Ga. The pile yarn is nylon with a pile height ranging from 0.75 to 1.0 inches. There are 27 stitches per 3 inches and the average finished pile weight ranged from 44 to 58 ounces per square yard. The primary backing is polybac, the secondary backing is jute, and the laminant is called hot back.

Optimum conditions for pressure and volumn of flow of chemicals are as follows:

Optimum spray pressure on spray nozzles 10 is 20-25 psi.

Spray nozzles 10 are TX3 Spray nozzles with a hollow cone, manufactured by Spraying Systems Co., North Ave. at Schmale Rd., Wheaton, Ill., 60187.

Pressure on siphon valves at least 30 psi to operate, and can range from 30-70 psi.

Figure 5:
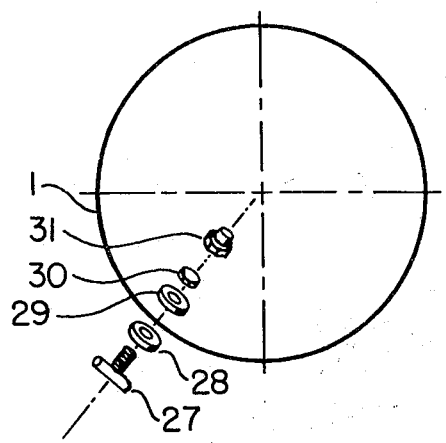
FIG. 5 is a detail view showing the means of nozzle arrangement components.
Figure 6:
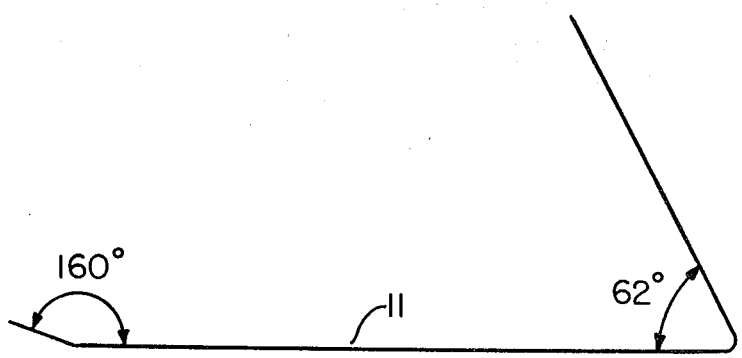
FIG. 6 is a detail of the solution collection reservoir which is mounted on the lower portion of the applicator body.

Nozzles 10 are assembled as shown in FIG. 5. Nozzle body 27 is fit through the wall of applicator body 1 and secured by means of metal washer 28, then rubber washer 29 to prevent leaking through body 1 spray body nut 30 and finally cone tip and nut 31. Hose 16, which is a ⅜" hose, feeds agricultural chemical from reservoir 13 through pump 14 and regulator 15 under pressure.

The exandable metal section allows for openings so that agricultural chemical can be sprayed thru and onto carpet 7 covering the outer surface of section 6. Expanded metal section 6 is designed to cover the opened side of body 1 and acts similar to a wire mesh or screen as well as support for carpet 7.

In the case of the instant invention, the recovery reservoir 11 forms a horizontal trough which is affixed to the underside of hollow horizontal cylindrical mounting chamber 1 and is located beneath carpet 7 and runs the full length of mounting chamber 1.

A minimum of 10 nozzles 10 were used in the instant invention.

I claim:

1. An apparatus which dispenses liquid agricultural chemical solution upon physical contact with foliage and plants recirculates any excess agricultural chemical solution, said apparatus comprising in combination the following:
    (a) a hollow horizontal cylindrical mounting chamber with an opened section on one side thereof;
    (b) an expanded metal section affixed to the mounting chamber, said expanded metal section covering the opened chamber side;
    (c) fabric covering the external surface of said expanded metal section;
    (d) means for spraying an agricultural chemical solution from a storage reservoir onto said fabric thereby saturating said fabric with agricultural chemical, said means for spraying agricultural chemical positioned and mounted on the rear inside surface of said hollow horizontal chamber so that spray is applied to the internal side of said fabric covering.
(e) means for recovering and returning excess agricultural chemical to said storage reservoir;
(f) means for bringing said saturated fabric into contact with an agricultural plant.

2. The apparatus of claim 1 wherein the means of spraying the agricultural chemical solution onto the fabric and thereby saturating the fabric is a plurality of nozzles spaced opposite the internal side of the fabric.

3. The apparatus of claim 1 wherein the recovering means for the excess chemical is a horizontal trough located below the fabric and affixed to the underside of the hollow cylindrical mounting cylinder, said trough extending the full length of the horizontal cylinder.

4. The apparatus of claim 1 wherein the fabric is nylon carpet pile yarn with a pile height ranging from about 0.75 to 1.0 inches, 27 stitches per 3 inches, an average finished pile weight of about 44–58 ounces per square yard, a primary backing of polybac and a secondary backing of jute.

5. The apparatus of claim 2 wherein the plurality of nozzles comprises at least 10 individual nozzles spaced equally across the interior of the hollow mounting cylinder opposite said fabric.

* * * * *